United States Patent
Choi et al.

(10) Patent No.: US 7,905,500 B2
(45) Date of Patent: Mar. 15, 2011

(54) ACTIVE GEOMETRY CONTROL SUSPENSION

(75) Inventors: Hae Ryong Choi, Seoul (KR); Seok Joo Lee, Seongnam (KR); Sang Ho Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 12/498,826

(22) Filed: Jul. 7, 2009

(65) Prior Publication Data

US 2010/0117313 A1 May 13, 2010

(30) Foreign Application Priority Data

Nov. 11, 2008 (KR) .................. 10-2008-0111755

(51) Int. Cl.
  *B62D 17/00* (2006.01)
(52) U.S. Cl. .................................................. 280/5.523
(58) Field of Classification Search ................ 280/5.52, 280/5.521, 5.522, 5.523, 86.751, 86.758
  See application file for complete search history.

(56) References Cited

U.S. PATENT DOCUMENTS

| | | | |
|---|---|---|---|
| 6,170,838 B1 * | 1/2001 | Laurent et al. | 280/5.508 |
| 6,511,078 B2 * | 1/2003 | Sebe | 280/5.509 |
| 6,688,620 B2 * | 2/2004 | Serra et al. | 280/124.135 |

FOREIGN PATENT DOCUMENTS

| | | |
|---|---|---|
| JP | 3-239612 A | 10/1991 |
| KR | 1996-0017420 A | 6/1996 |
| KR | 10-2008-0043953 A | 5/2008 |

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

An active geometry control suspension may reduce production cost with simple scheme and provide design freedom. An active geometry control suspension of the present invention includes an assist link including a first link of which an end is rotatably connected to a vehicle body and a second link of which an end is connected to the first link and the other end is rotatably connected to a wheel, a clutch assembly selectively connecting a connecting portion of the first link and the second link to the vehicle body and a driving unit operating the clutch assembly.

8 Claims, 4 Drawing Sheets

ACTIVE GEOMETRY CONTROL SUSPENSION

CROSS-REFERENCE TO RELATED APPLICATION

The present application claims priority to Korean Patent Application Number 10-2008-0111755 filed on Nov. 11, 2008, the entire contents of which application is incorporated herein for all purposes by this reference.

BACKGROUND OF THE INVENTION

1. Field of the Invention

The present invention relates to an active geometry control suspension. More particularly, the present invention relates to an active geometry control suspension which may reduce production cost with simple scheme and provide design freedom.

2. Description of Related Art

General active geometry control suspension (hereinafter, it will be mentioned as an AGCS) provides turning stability in high speed turning of a vehicle.

The general AGCS includes an actuator operated according to electric signals, a control lever controlled by the actuator and an assist arm lowered by the operation of the control lever in high speed turning of a vehicle.

However, the AGCS lowering the assist arm is complicated in scheme, manufacturing cost is high and total weight of the total system is relative increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an active geometry control suspension which may reduce production cost with simple scheme and provide design freedom so that fuel consumption of a vehicle may be improved.

In aspect of the present invention, the active geometry control suspension may include an assist link including a first link and a second link, wherein one end of the first link is rotatably connected to a vehicle body and one end of the second link is connected to the other end of the first link and the other end of the second link is rotatably connected to a wheel, a clutch assembly selectively connecting a connecting portion of the first link and the second link to the vehicle body, and a driving unit operating the clutch assembly.

The connecting portion of the first and second links may be configured to have one degree of freedom about a rotation axis of the connecting portion.

The driving unit may include a hydraulic actuator.

The clutch assembly may include a first disk disposed to the other end of the first link, and a second disk fixed to the vehicle body and configured to be selectively connected to the first disk according to an operation of the driving unit, wherein the driving unit includes an actuator with a rod fixed to the second disk.

In another aspect of the present invention, the active geometry control suspension of claim 1, may further include a bracket formed to the other end of the first link, and a rotating shaft which is disposed to the bracket and connects the other end of the first link and the one end of the second link so as to permit one degree of freedom between the first link and the second link according a rotation axis of the connecting portion thereof, wherein the clutch assembly includes, a first disk fixed to the bracket, and a second disk fixed to the vehicle body and configured to be selectively connected to the first disk according to an operation of the driving unit, wherein the first and second disks are aligned along the rotation axis of the connecting portion of the first and second links, and wherein the driving unit includes an actuator with a rod fixed to the second disk.

The active geometry control suspension according to various aspects of the present invention may be realized without a control lever and be provided with an assist link including a first link and a second link so that total weight of the system can be reduced and fuel consumption of a vehicle may be improved.

A connecting point of the first link and the second link may be connected to a vehicle body in normal driving and released from the vehicle body in turning or bumping of the vehicle so that toe in may be realized easily.

The active geometry control suspension may provide turning stability in high speed turning of a vehicle.

Manufacturing cost may be reduced by eliminating a control lever.

In addition, the actuator of the active geometry control suspension may connect or release of the connecting point of the first link and the second link instead of directly controlling the assist link so that size of the actuator can be reduced and total weight of a vehicle also can be reduced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
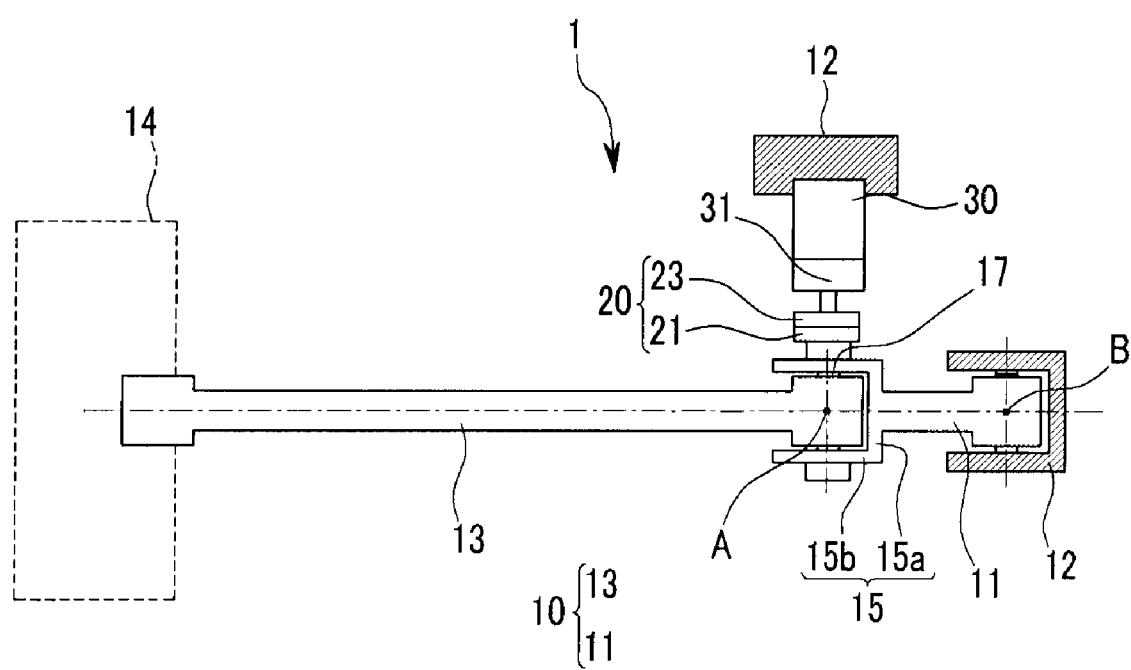
FIG. 1 is a drawing showing an exemplary active geometry control suspension according to the present invention.

FIG. 1 is a drawing showing an active geometry control suspension according to various embodiments of the present invention.

As shown in FIG. 1, an active geometry control suspension (AGCS) 1 according to various embodiments of the present invention includes an assist link 10 including a first link 11 of which an end is rotatably connected to a vehicle body 12 and a second link 13 of which an end is connected to the first link 11 and the other end is rotatably connected to a wheel 14, a clutch assembly 20 selectively connecting a connecting portion of the first link 11 and the second link 13 to the vehicle body 12 and a driving unit 30 operating the clutch assembly 20.

The assist link 10 induces understeering of vehicle for providing turning stability. The assist link 10 connects the wheel 14 to the vehicle body 12.

In this case, toe-in of an inside wheel of a rear wheel (a wheel to bump) and toe-out of an outside wheel of the rear wheel (a wheel to rebound) may induce turning stability. For example, the active geometry control suspension 1 increases Roll Steer of the outside wheel of the rear wheel, that is, toe-in is increased compared to toe-in when the AGCS 1 is not operated.

Thus, the assist link 10 increases Cornering Force to a rear wheel during cornering the circular path so that the vehicle may be induced in under steer condition and handling performance may be enhanced.

The assist link 10 may connect the wheel 14 and the vehicle body 12 through a knuckle.

The assist link 10 includes the first link 11 of which the end is rotatably connected to a vehicle body 12 and the second link 13 of which the end is connected to the first link 11 and the other end is rotatably connected to a wheel 14.

The end of the first link 11 may be directly connected to the vehicle body 12. The first link 11 is rotatably connected to the vehicle body 12 and is rotatable when the wheel 14 bumps or a vehicle turns in high speed. A bracket 15 is disposed to connecting the first link 11 and the second link 13.

The bracket 15 is mounted to the other end of the first link 11. The bracket 15 includes a plate 15a mounted to the other end of the first link 11 and a pair of supporting portion 15b protruded from the plate 15a.

A rotating shaft 17 is disposed between the supporting portions 15b and the second link 13 is rotatably connected to the rotating shaft 17.

The clutch assembly 20 is configured to a connecting portion of the first link 11 and the second link 13. The clutch assembly 20 selectively connects the connecting portion (it is indicated as "A") of the first link 11 and the second link 13 to the vehicle body 12. The release operation of the clutch assembly 20 releases the connecting portion A from the vehicle body 12 and induces understeering of the rear wheel when the wheel 14 bumps or a vehicle turns in high speed.

The clutch assembly 20 includes a first disk 21 disposed to the other end of the first link 11 and a second disk 23 selectively connected to the first disk 21 by an operation of the driving unit 30.

The first disk 21 is protruded fixed to a side of the bracket 15. The first disk 21 and the second disk 23 may be selectively engaged each other. Or, the first disk 21 and the second disk 23 may have concave and convex shape respectively or vice versa for engagement. The second disk 23 may be slid to be connected to the first disk 21 by the operation of the driving unit 30.

The connection of the first disk 21 and the second disk 23 is released for inducing understeering when a vehicle turns in high speed or a wheel bumps.

Hereinafter, toe-in of an outside wheel of rear wheels will be explained referring operations of the assist link 10 including connection and release of the first disk 21 and the second disk 23.

Connecting state of the first disk 21 and the second disk 23 will be described.

Figure 3:
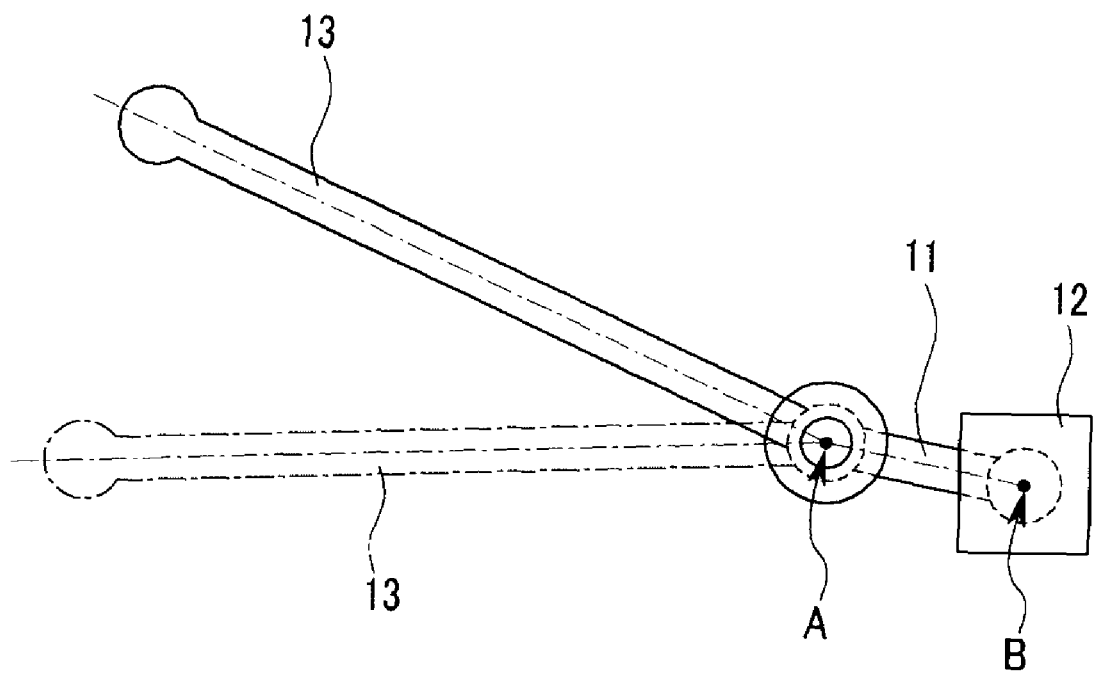
FIG. 3 is a drawing showing operations of an exemplary assist link in a connecting state of the first disk and the second disk.

FIG. 3 is a drawing showing operations of an assist link in connecting state of the first disk and the second disk.

As shown in FIG. 1 and FIG. 3, when the first disk 21 and the second disk 23 are connected by the connecting operation of the driving unit 30, the second link 13 functions as a general assist link by itself. That is, both ends of the first link 11 are fixed to the vehicle body 12 so that the second link 13 can rotate by itself and function as a general assist link.

When the first disk 21 and the second disk 23 are connected, toe-in is relatively small so that abrasion of tires can be prevented and stability in straight driving can be enhanced.

Hereinafter, release state of the first disk 21 and the second disk 23 will be explained.

Figure 2:
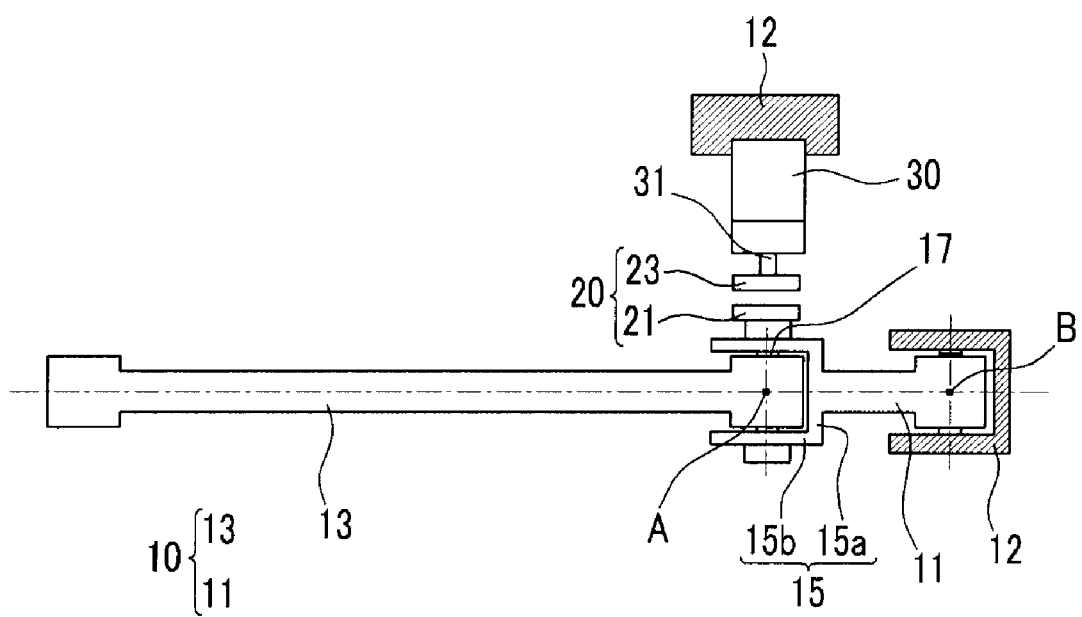
FIG. 2 is a drawing showing an exemplary active geometry control suspension of which a first disk and a second disk are released.
Figure 4:
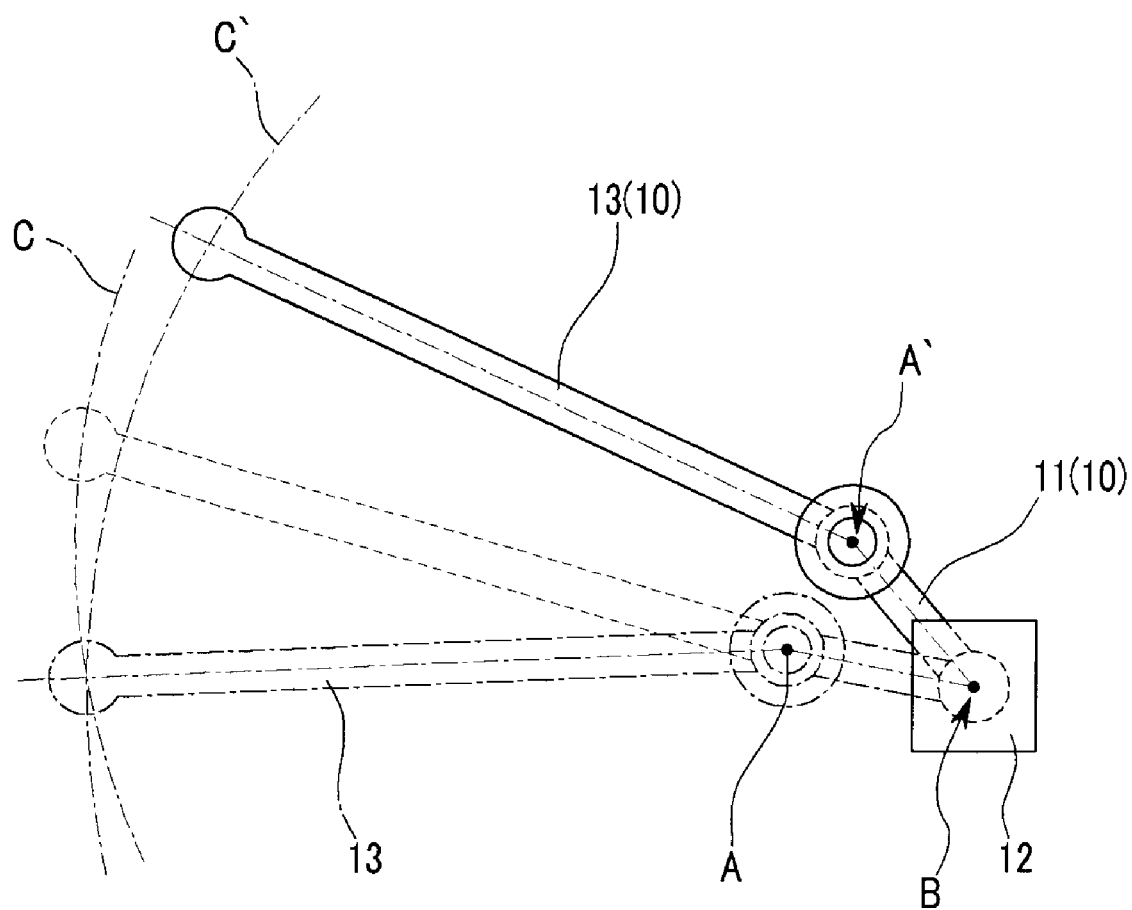
FIG. 4 is a drawing showing tracks of the assist link in a connecting state and a released state of the first disk and the second disk.

FIG. 2 is a drawing showing an active geometry control suspension of which a first disk and a second disk are released and FIG. 4 is a drawing showing tracks of the assist link in connecting state and released state of the first disk and the second disk.

FIG. 2 and as shown in FIG. 4, if the first disk 21 and the second disk 23 are released by an release operation of the driving unit 30 when the wheel 14 bumps or a vehicle turns in high speed, both the first link 11 and the second link 13 function as an assist link. In this state, the first link 11 can rotate about a connection point B of the first link 11 and the vehicle body vehicle 12 and thus both the first link 11 and the second link 13 function as an assist link.

In the drawing, bending may be generated between the second link 13 and the first link 11, because the second link 13 and the first link 11 are rotatable to each other. Thus, toe-in can be easily generated when the wheel 14 bumps or a vehicle turns in high speed and that induces under steer conditions and handling performance may be enhanced.

In the mean time, the driving unit 30 can be formed by an actuator connected to the second disk 23 via a rod 31. The actuator can be configured to the vehicle body 12 and selectively fix the connecting portion A to the vehicle body 12.

In various embodiments of the present invention, the actuator may include a hydraulic actuator or an electromagnetic actuator so that the second disk 23 may move upwards or downwards by the solenoid.

From another angle, operations of the active geometry control suspension according to various embodiments of the present invention will be explained.

As shown in FIG. 3, the second link 13 functions as an assist link when the connecting portion A of the assist link 10 is fixed to the vehicle body 12.

As shown in FIG. 4, the connecting portion A can be moved to A' in the drawing by release operation of the driving unit 30 when the wheel 14 bumps or a vehicle turns in high speed. In the drawing, while the position of the connecting portion A' is turned around the B for better comprehension and ease of description, it is not limited to the description.

That is, the first link 11 and the second link 13 simultaneously rotate around the poison B and induce toe-in. Comparing to the state that the connecting portion A in FIG. 3 is connected to the vehicle body 12, the wheel 14 can be moved inwardly so that toe-in can be easily induced.

Referring to FIG. 4, C is a track of the assist link 10 when the driving unit 30 is controlled to connect the connecting portion A to the vehicle body 12 and C' is a track of the assist link 10 when the driving unit 30 is controlled to release the connecting portion A from the vehicle body 12. As shown in FIG. 4 C' is positioned relatively inward to the vehicle body 12.

As described above, the assist link 10 according to various embodiments of the present invention may easily induce toe-in when the wheel 14 bumps or a vehicle turns in high speed so that driving performance can be improved.

For convenience in explanation and accurate definition in the appended claims, the terms "inside", "rear", and "front" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active geometry control suspension comprising:
    an assist link including a first link and a second link, wherein one end of the first link is rotatably connected to a vehicle body and one end of the second link is connected to the other end of the first link and the other end of the second link is rotatably connected to a wheel;
    a clutch assembly selectively connecting a connecting portion of the first link and the second link to the vehicle body; and
    a driving unit operating the clutch assembly.

2. The active geometry control suspension of claim 1, wherein the connecting portion of the first and second links is configured to have one degree of freedom about a rotation axis of the connecting portion.

3. The active geometry control suspension of claim 1, wherein the driving unit includes a hydraulic actuator.

4. The active geometry control suspension of claim 1, further comprising:
    a bracket formed to the other end of the first link; and
    a rotating shaft which is disposed to the bracket and connects the other end of the first link and the one end of the second link so as to permit one degree of freedom between the first link and the second link according a rotation axis of the connecting portion thereof.

5. The active geometry control suspension of claim 4, wherein the clutch assembly comprises:
    a first disk fixed to the bracket; and
    a second disk fixed to the vehicle body and configured to be selectively connected to the first disk according to an operation of the driving unit,
    wherein the first and second disks are aligned along the rotation axis of the connecting portion of the first and second links.

6. The active geometry control suspension of claim 5, wherein the driving unit comprises an actuator with a rod fixed to the second disk.

7. The active geometry control suspension of claim 1, wherein the clutch assembly comprises:
    a first disk disposed to the other end of the first link; and
    a second disk fixed to the vehicle body and configured to be selectively connected to the first disk according to an operation of the driving unit.

8. The active geometry control suspension of claim 7, wherein the driving unit comprises an actuator with a rod fixed to the second disk.

* * * * *